July 7, 1964  E. WIEGEL  3,139,850
METHOD AND DEVICE FOR MANUFACTURING HELICALLY FORMED TUBES
Filed Jan. 26, 1961
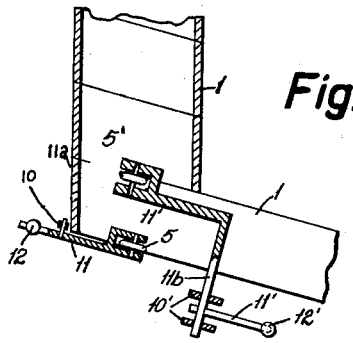
Fig. 1a
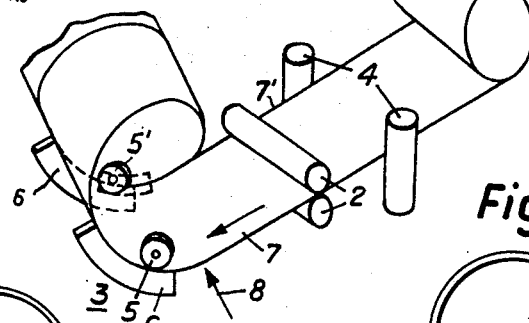
Fig. 1
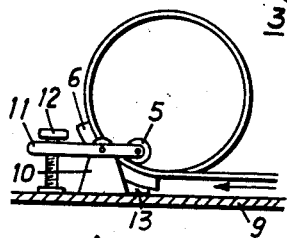
Fig. 2
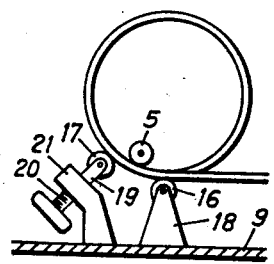
Fig. 3
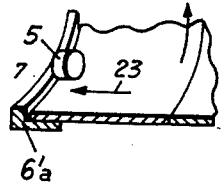
Fig. 4
Fig. 5
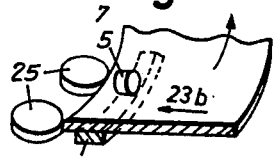
Fig. 6
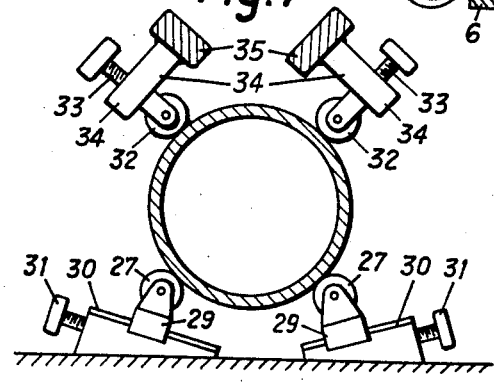
Fig. 7
INVENTOR.
Eduard Wiegel
BY Werner Warren Kleeman
Attorney United States Patent Office 3,139,850
Patented July 7, 1964

3,139,850
METHOD AND DEVICE FOR MANUFACTURING HELICALLY FORMED TUBES
Eduard Wiegel, Dusseldorf, Germany, assignor to Intercontinental Enterprises, Dusseldorf, Germany, a corporation of Germany
Filed Jan. 26, 1961, Ser. No. 85,149
Claims priority, application Switzerland Jan. 30, 1960
11 Claims. (Cl. 113—35)

The present invention relates to a novel method of and apparatus for the production of welded tubing and, more particularly, to an improved method and device for the manufacture of helically-formed welded tubes and the like of the type formed of metal strip or skelp wound in such a manner as to have imparted thereto a helically arranged welding seam, said metal strip being supplied to a stationary shaping or bending mechanism by means of a feeder or driving unit. The device of the present invention is particularly suitable for the production of butt welded helical tubes although other types of welding operations might be employed therewith, and is readily capable of forming tubes of different diameters, gauge, length and composition.

A number of methods and devices for the manufacture of helically formed tubes have previously been proposed and known to the art. By way of example, a device is known which wraps a strip onto a continuously rotating mandrel in such a manner that the lateral edges of the strip establish mutual contact with one another and are then welded together. However, when employing a device of such construction several problems and disadvantages are encountered. In the first place, it is comparatively difficult to impart a satisfactory welding seam to the metal strip located in wound condition on the mandrel. Additionally, devices of this type present difficulties in changing over from one tube size to another since the mandrel itself and all the members forcing the metal strip against the mandrel must be exchanged. Moreover, devices employing such a rotating mandrel are costly and complex in design since they must of necessity be provided with a substantial number of moving parts.

Devices for the manufacture of helically formed or spirally welded tubes have been proposed wherein the metal strip is inserted into a stationary shaping mechanism. This shaping mechanism comprises several rotatable rollers which engage the metal strip from both the outside and the inside so as to bend or deflect said strip into a desired configuration. The length of the rollers corresponds substantially to the width of the metal strip. The metal strip is moved through these rotatable rollers by means of a feed or driving device, said rotatable rollers causing the strip to be bent. It has been found that such devices have certain disadvantages in their use. For example, it is known that the strip must be inserted obliquely into the shaping mechanism so that the edges of the metal strip will abut against one another so as to produce a helically wound tube. The metal strip must therefore be bent by the rollers when inserted into the shaping mechanism while said strip is being laterally displaced relative to the rotatable bending rollers. The rotatable rollers must thus absorb two simultaneous movements, namely, the rotational movement of the tube which is being formed and the axial displacement of the tube. However, the rollers are only able to accommodate one movement, that is, the rotational movement of the tube being formed. Consequently, the axial displacement of the tube results in considerable friction between the rotatable rollers and the metal strip from which the tube is formed. It is readily to be appreciated that the rotatable rollers cannot in this case satisfactorily perform their function of preventing sliding friction since such sliding friction will always be produced independently of the arrangement of the rollers. The rollers will therefore be subject to rapid wear resulting in shutdown of the machine for replacement purposes and increasing operational costs. In addition, these devices can only be changed from one tube size to another with great difficulty.

Other devices for the manufacture of spirally welded tubes have been proposed in which the metal strip is fed into a shaping mechanism by means of a conveying unit, by way of example via power driven rollers. The shaping mechanism consists of two concentrically arranged tubes or segments thereof which shape the incoming metal strip into a helical formed tube. Apparatus of this type have not been satisfactory since considerable frictional resistance occurs between the forming tubes and the strip which may, on the one hand, cause damage to the metal strip and, on the other hand, considerably increases the driving power required for feeding of the metal strip into the shaping mechanism. Furthermore, these devices can be adjusted from one tube size to another only with great difficulty since the two shaping tubes must be exchanged. Moreover, the shaping tubes are subject to considerable wear. A further disadvantage of this type of device for the manufacture of spirally welded tubes resides in the fact that the welding area is not readily accessible so that welding is rendered more difficult, this is particularly so because the shaping tubes must not be softened by the heat generated during the welding operation.

Accordingly, it is an important object of the present invention to provide a method of and apparatus for the manufacture of helically formed tubes which does not exhibit the disadvantages recited hereinabove.

A further object of the present invention is to provide a device of the type described wherein frictional forces between the metal strip or skelp to be helically shaped and the shaping mechanism are very small so that relatively small forces are correspondingly required to feed the metal strip into the shaping mechanism.

Yet a further object of the present invention is to provide a novelly constructed shaping mechanism wherein the welding area is readily accessible and where the components for carrying out the shaping operation can easily be exchanged so that the shaping mechanism may readily be adjusted from one tube size to another.

Another object of the present invention is to provide a device for the manufacture of tubes having a helical welding seam wherein only a few components of the shaping mechanism are subject to wear, which components may readily be replaced.

The apparatus according to the present invention is provided with a shaping mechanism which comprises two rollers which force the two lateral edges of the metal strip or skelp against abutments which may be adjusted in accordance with the diameter of the tube to be formed. The dimension of the two rollers and of the abutments in the direction of the formed tube is small as compared to the width of the metal strip. The present invention is therefore based on the discovery that it is entirely sufficient for the manufacture of tubes of the type described to shape the edges of the incoming metal strip or a region in close proximity thereto in order to wind the strip into a series of convolutions defining a helically formed tube.

The inner shaping means, for example, the rollers are relatively small in dimension in comparison to the width of the incoming metal strip so that practically no, or a minimum amount of friction is obtained at this point. The exterior shaping means, that is, the abutments also cause practically no friction due to their relatively small width so that the tubes can be shaped with a minimum of effort and power requirement. The exteriorly arranged shaping means or abutments preferably consist of a rail-shaped backing shoe, the radius of which substantially corresponds to that of the tube to be formed, or of two rollers at least one of which is adjustable so that the diameter of the tube to be formed may be changed. It is readily to be appreciated that the shaping means provide considerable advantages over the devices for the manufacture of tubes recited hereinabove and known in the art.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURE 1 is a diagrammatic view of a feeding mechanism, and shows details of a shaping mechanism for winding a metal strip or skelp into a helically formed tube illustrating in detail the bending means;

FIGURE 1a is a cross-sectional plan view taken through a helically formed tube showing details of the bending rollers shown in FIGURE 1;

FIGURE 2 is a side view of the shaping mechanism shown in FIGURE 1 showing details of the supports and adjusting means for the bending rollers;

FIGURE 3 is a side view of a further embodiment of the shaping mechanism designed according to the teachings of the present amendment;

FIGURES 4, 5 and 6 show details of means for taking up axial forces applied by the tube being formed and the incoming metal strip; and FIGURE 7 shows details of a guiding mechanism for guiding the formed tube.

Referring now to the drawings and more particularly to FIGURES 1, 1a and 2 thereof, there is illustrated an apparatus readily adapted for the manufacture of helically formed tubes and the like from a metal strip or skelp, wherein only enough of the apparatus has been shown which is necessary to provide for a clear understanding of the invention. A metal strip or skelp 1 which is initially in coiled condition is unwound from a stock roll and is fed by means of power driven feeding rollers 2 to a shaping mechanism generally indicated by reference numeral 3. Between the coiled metal strip 1 and the feeding rollers 2 there may be arranged vertical guide rollers 4 which serve to laterally guide the moving metal strip 1. The rollers 2 and 4 may be supported on a swivable table in order to vary the infeed angle with which the metal strip is fed into the shaping mechanism 3, in a manner known to the art.

The shaping or bending mechanism 3 according to the present invention consists of a pair of spatially separated internal rollers 5 and 5' and the two external, spatially separated abutment members 6 and 6', which in the shown embodiment are designed in the form of backing shoes or rails. The internal rollers 5 and 5' and the two exterior backing shoes or rails 6 and 6' are movably positionable so that they can be located at or adjacent the lateral edges of the metal strip or skelp 1, which edges are designated by reference numerals 7 and 7'. According to the invention it has been discovered that deformation or bending of the region adjacent the lateral edges of the metal strip is entirely sufficient to form said metal strip into a series of adjacently arranged convolutions defining a helically formed tube.

In FIGURES 1a and 2 the means for adjusting and supporting the bending means of the shaping mechanism 3 are more clearly shown. In FIGURE 1a it can be seen that each of the internal rollers 5 and 5' is supported by a separate bifurcated or forked member 11 and 11' pivotably carried by the support members 10 and 10', respectively. Thus by actuating the spindles 12 and 12' the rollers 5 and 5', respectively, are caused to radially move about an axis of rotation defined by members 11a and 11b respectively. In this manner, the rollers 5 and 5' can be positioned in a radial direction of the tube to be formed in order to accommodate for various metal stock thicknesses. The supporting brackets 10 and 10' are adapted to be movable and fixed at any desired location on a support plate 9 in order to accommodate for metal stock of various widths. The rollers 5 and 5' can thus be freely positioned in accordance with the physical characteristics of the metal strip to be formed. It is to be noted that the center point of the respective rollers 5 and 5' are located slightly behind the longitudinal axis of the formed tube, and a line drawn through the center points of both of the rollers 5 and 5' is substantially parallel to said longitudinal axis. It is desirable that the rollers 5 and 5' be positioned at the region where initial bending of the strip is desired.

In FIGURE 2 the details of the outermost roller 5 and its support means as viewed in the direction of arrows 8 of FIGURE 1 are clearly shown. The backing shoes 6 and 6' may be supported by bracket members 13 and may be removably secured to the base plate or support 9 by suitable fastening means, as for example by bolting. In this manner, the backing shoes 6 and 6' may be selectively positioned in accordance with the dimensions of the strip to be handled.

It is thus to be appreciated that it is possible to replace the backing shoes 6 and 6' with a few simple manipulations whereby the shaping mechanism may be adjusted for the production of tubes having a different diameter. The spindles 12 and 12' force the rollers 5 and 5' against the incoming metal strip or skelp 1 in such a manner that it will intimately engage its associated backing shoe 6 and 6' whereby the metal strip is caused to assume the curvature of such backing shoe. As can be seen from the drawing, the backing shoes 6 and 6' cover only a small outer portion of the tube being formed. The angle at which the backing shoe 6 or 6' is positioned relative to the center of the tube being formed depends on the diameter of the tube, the strip material and its thickness: this angle may possibly be only 20 to 30°. The backing shoe 6' and the roller 5' which are not visible in FIGURE 2 are arranged in a manner similar to the roller 5 and the backing shoe 6.

In FIGURE 3 there is illustrated a further embodiment of the outer abutment 6. In the present embodiment the backing rail 6 shown in FIGURE 1 is replaced by a pair of rollers 16 and 17 arranged on opposite sides of the center of the inner roller 5. The roller 16 is carried by a bracket or support 18 mounted on base plate 9 and cannot be adjusted. The roller 17 is rotatably held between a forked or bifurcated member 19 which, in turn, is fixed to a rotatable spindle 20. The bifurcated member 19 and the spindle 20 are arranged in a bracket 21 which is attached to a base plate 9 in a manner similar to the supporting bracket 18. Actuation of the rotatable spindle 20 permits radial movement of the roller 17 with respect to the tube axis. The support for the internal roller 5 is designed in a manner similar to that described in conjunction with FIGURE 2, and for convenience in illustration has not been shown in FIGURE 3.

In the embodiment of FIGURE 3 a similar arrangement of two outer rollers and one inner roller is provided for the other lateral edge 7' of the metal strip. By adjusting the position of the displaceable rollers 5 and 17 and the corresponding rear rollers (not shown) it is thus possible to produce tubes of any desired diameter. It may further be appreciated that by reason of the arrangement of the components and construction thereof practically no, or minimum, friction is produced so that the only power required is that sufficient to shape the metal strip. The extremely low friction is primarily attributable to the fact that the shaping or bending means do not extend over the entire width of the metal strip or skelp 1, but only over a small portion or fraction of the surface or width thereof. By way of example, if the roller 5 were designed to extend over the entire width of the metal strip 1 supplied to the shaping mechanism, in accordance with previous methods and apparatus known to the art, frictional losses would not only occur in the bearings of this roller but, the same would also result at the surface since the metal strip 1 must also be displaced in the direction of the longitudinal axis of the tube. Accordingly, any frictional losses caused by such an arrangement would indeed be substantial.

The shaping or bending mechanism may also be designed in such a manner that it may absorb forces in the direction of the longitudinal axis of the tube being formed. Examples of constructional arrangements suitable for carrying out such a function are shown in FIGURES 4 to 6. In the embodiment according to FIGURE 4, the forwardmost or trailing lateral edge 7 of the formed convolution is provided with a backing shoe 6a which has an L-shaped cross-section as clearly shown in this figure. The backing shoe 6a may, therefore, absorb forces exerted in the direction of the arrow 23. In the embodiment according to FIGURE 5, which substantially corresponds to the arrangement of FIGURE 3 the outer roller 16' may be provided with a shoulder or rim 24 so that axial forces in the direction of the arrow 23a are again absorbed. The arrangement shown in FIGURE 6 shows the possibility of providing separate rollers 25 which guide the lateral trailing edge 7 of the incoming metal strip 1 and also absorb forces in the direction of the arrow 23b.

After deformation of the metal strip or skelp 1, the adjoining or contiguous edges of the adjacent convolutions or coils thereof are welded together by application of welding heat. The welding is preferably located in the region of initial contact between the two contiguous edges to be joined. Various welding methods and devices suitable for the welding operation are known in the art so that a further description may be dispensed with. It may be assumed that any of the conventional welding methods and apparatus may be employed. It should be pointed out, however, that the welding operation is substantially simplified when employing the teachings of the present invention in comparison with other known devices since the low friction between the shaping mechanism and the metal strip enables the wound tube to be easily moved in order to acquire proper pressure for carrying out welding of the points of contact.

Upon completion of the welding operation, the thus produced tube may be inserted between four guide rollers arranged at substantially regular intervals and angularly offset from one another. This step is necessary to obtain a correct calibration and alignment of the tube. One form of performed embodiment for these guide rollers is shown in FIGURE 7. The guide rollers comprise a pair of bottom rollers 27, each attached to a slide member 29 which rides upon an associated inclined guide or supporting block 30. The slide members 29 may be positionably adjusted by means of the spindles 31 to cause the slide members to be displaced lengthwise of the supporting blocks 30. The two upper guide rolls 32 are adjustable by spindles 33 in a similar manner, said spindles being guided in supporting members 34 which are, in turn, mounted on carrier rails 35 arranged parallel with the longitudinal axis of the tube. By means of the spindles 31 and 33 and the spindles 20 (FIGURE 3) and 12 (FIGURE 2) and by appropriate selection of the backing shoes 6 and 6' it will be possible to manufacture practically any commonly employed tube diameter in a very simple manner.

When the device is placed into operation, a leader tube is preferably employed which is also preferably formed of a helically welded strip which is provided at one end with a rectangular cutout taken through the strip. By means of this leader tube, the diameter of which corresponds to that of the tube to be manufactured, the various spindles noted above may be adjusted. The incoming edge of the metal strip 1 is then welded to the free edge or rectangular cutout of the strip forming the leader tube and the apparatus is placed into operation. The leader tube will, therefore, guide the incoming strip until the latter has itself been shaped into a tube. It is quite apparent that this leader tube may be used over and over again. The various rollers 5, 16, 17, 27 and 32 and their corresponding rearwardly arranged counterparts may be cylindrical. Preferably, however, they are barrel-shaped or domed as seen in FIGURE 1a, so that the surface contact with the tube and the strip thereof, respectively, is small. The shaping mechanism disclosed not only provides for the manufacture of imperforate or solid walled tubes, but is also capable of producing tubes having holes or perforations for example tubes, useful as well pipes or filter tubes and the like may be produced as well. In the latter instance it is only necessary to employ a metal strip provided with suitable perforations. It is readily to be appreciated that the shaping mechanism and method of the present invention permits relatively simple bending of a metal strip into a series of adjacent convolutions defining a helically wound tube with minimum friction between the shaping means and the metal strip.

Having thus described the present invention what is desired to be secured by the United States Letters Patent, is:

1. In a shaping device for winding a strip of metal stock helically into tubular form having a series of successive convolutions with the opposite edge portions thereof meeting in a helical seam; deforming means for helically winding a strip of metal stock into tubular form, said deforming means only contacting a region of said metal stock along opposed faces thereof closely adjacent its lateral edges, and means cooperable with said deforming means to adjustably position the latter to accommodate for the handling of metal stock of variety of widths and thickness, said deforming means including a pair of spatially separated inner rollers for contacting one face of said metal stock closely adjacent its lateral edges defining an inner surface of said tubular form and a pair of spatially separated abutment members contacting an opposite face of said metal stock closely adjacent its lateral edges defining an outer surface of said tubular form.

2. In a shaping device for winding a strip of metal stock helically into tubular form having a series of successive convolutions with the opposite edge portions thereof meeting in a helical seam; deforming means for helically winding a strip of metal stock into tubular form, said deforming means being positioned to only contact a region of said metal stock immediately adjacent its lateral edges, and means for said deforming means to adjustably position the latter to accommodate for the handling of metal stock of a variety of widths and thickness, said deforming means including a pair of spatially separated inner rollers for contacting one face of said metal stock defining an inner surface portion of said tubular form and a pair of spatially separated outer abutment members contacting an opposite face of said metal stock defining an outer surface portion of said tubular form, said inner rollers having an axis of rotation disposed in a plane perpendicular to the lateral edges of said stock, at least one inner roller and one outer abutment member is arranged adjacent each of said lateral edges of said metal stock, the dimension of said inner rollers and said outer abutment members taken in the axial direction of said tubular form being relatively small in comparison with the width of said metal stock.

3. In a shaping device according to claim 2, wherein said outer abutment members are positioned to correspond to the desired diameter of said tubular form.

4. In a shaping device according to claim 3, wherein said outer abutment members are backing rails having a radius of curvature corresponding to the radius of said tubular form, said inner rollers urging said metal stock into contact with said backing rails.

5. In a shaping device according to claim 4, wherein said backing rails are arranged parallel to said lateral edges of said metal stock.

6. In a shaping device according to claim 2, wherein said positioning means for said deforming means permit displacement of said inner rollers in a radial direction with respect to said tubular form to accommodate metal stock of different thickness.

7. In a shaping device according to claim 2, wherein each of said outer abutment members is a pair of spaced roller members arranged on opposite sides of its associated inner roller, and means cooperable with said outer abutment members to adjustably move the same in a radial direction with respect to the tubular axis.

8. In a shaping device according to claim 7, wherein one roller of said pair of roller members is fixedly positioned while the remaining roller is adjustable.

9. In a shaping device according to claim 8, wherein said fixedly positioned roller of each pair of roller members is located at the initial point of curvature of said metal stock.

10. In a shaping device according to claim 7, wherein at least one roller of said pair of roller members is provided with a rim portion adapted to absorb forces exerted in an axial direction of said tubular form.

11. In a shaping device according to claim 4, wherein one of said backing rails is positioned along the trailing lateral edge of the metal stock and possesses an L-shaped cross-section including an upright leg portion adapted to absorb forces exerted in an axial direction of said tubular form.

References Cited in the file of this patent

UNITED STATES PATENTS

| 1,238,987 | Colby | Sept. 4, 1917 |
| 1,659,792 | Thorsby | Feb. 21, 1928 |
| 1,884,658 | Gladkov et al. | Oct. 25, 1932 |
| 2,635,572 | Hesterman | Apr. 21, 1953 |
| 2,714,864 | Fay | Aug. 9, 1955 |
| 3,070,054 | Grieten | Dec. 25, 1962 |

FOREIGN PATENTS

| 1,056,320 | France | Oct. 21, 1953 |
| 482,413 | Great Britain | Mar. 29, 1938 |